United States Patent
Zhu et al.

(10) Patent No.: US 12,532,243 B2
(45) Date of Patent: Jan. 20, 2026

(54) PERFORMING A RESTRICTED REGISTRATION IN A WIRELESS COMMUNICATION NETWORK

(71) Applicant: HUAWEI TECHNOLOGIES CO., LTD., Guangdong (CN)

(72) Inventors: Qianghua Zhu, Beijing (CN); Wenfu Wu, Shanghai (CN); Qi Yao, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 731 days.

(21) Appl. No.: 17/707,438

(22) Filed: Mar. 29, 2022

(65) Prior Publication Data

US 2022/0225212 A1 Jul. 14, 2022

Related U.S. Application Data

(63) Continuation of application No. PCT/CN2020/119660, filed on Sep. 30, 2020.

(30) Foreign Application Priority Data

Sep. 30, 2019 (CN) .......................... 201910945824.9

(51) Int. Cl.
*H04W 48/02* (2009.01)
*H04W 8/18* (2009.01)
(Continued)

(52) U.S. Cl.
CPC ............ *H04W 48/02* (2013.01); *H04W 8/18* (2013.01); *H04W 12/08* (2013.01); *H04W 60/00* (2013.01); *H04W 76/10* (2018.02)

(58) Field of Classification Search
CPC ....... H04W 8/08; H04W 60/00; H04W 76/10; H04W 48/18; H04W 48/02; H04W 48/00;
(Continued)

(56) References Cited

U.S. PATENT DOCUMENTS

2009/0253403 A1* 10/2009 Edge .................. H04W 4/90
455/404.2
2013/0229931 A1* 9/2013 Kim .................... H04W 48/16
370/252
(Continued)

FOREIGN PATENT DOCUMENTS

CN 108702724 A 10/2018
CN 109891962 A 6/2019
(Continued)

OTHER PUBLICATIONS

3GPP TS 23.003 V16.0.0 (Sep. 2019), "3rd Generation Partnership Project; Technical Specification Group Core Network and Terminals; Numbering, Addressing and Identification (Release 16)," Sep. 2019, 134 pages.
(Continued)

*Primary Examiner* — Allahyar Kasraian
(74) *Attorney, Agent, or Firm* — Fish & Richardson P.C.

(57) ABSTRACT

This application provides example communication methods and example apparatuses. One example method includes receiving, by an access management network element, a registration request from a terminal device. The access management network element can then obtain configuration type indication information. The access management network element can then determine, based on the configuration type indication information, to perform restricted registration. The access management network element can then start a restricted registration timer. After the restricted registration timer expires, the access management network element can initiate a deregistration procedure to deregister the terminal device from a network.

12 Claims, 7 Drawing Sheets

(51) Int. Cl.
   *H04W 12/08* (2021.01)
   *H04W 60/00* (2009.01)
   *H04W 76/10* (2018.01)
(58) Field of Classification Search
   CPC ....... H04W 8/18; H04W 60/06; H04W 12/08; H04W 12/06
   See application file for complete search history.

(56) References Cited

U.S. PATENT DOCUMENTS

| | | | | |
|---|---|---|---|---|
| 2013/0252609 A1* | 9/2013 | Patwardhan | .......... | H04W 60/00 455/435.1 |
| 2013/0305330 A1 | 11/2013 | Palanigounder | | |
| 2014/0273911 A1* | 9/2014 | Dunn | ................ | H04L 65/1073 455/404.1 |
| 2016/0066333 A1* | 3/2016 | Suzuki | ................ | H04W 24/02 370/329 |
| 2016/0353453 A1* | 12/2016 | Au | ........................ | H04L 5/0051 |
| 2018/0317200 A1* | 11/2018 | Kim | ...................... | H04W 68/02 |
| 2019/0007500 A1* | 1/2019 | Kim | ...................... | H04L 67/141 |
| 2019/0109823 A1* | 4/2019 | Qiao | ...................... | H04M 15/66 |
| 2019/0174449 A1* | 6/2019 | Shan | ...................... | H04W 60/04 |
| 2020/0128614 A1 | 4/2020 | Ying et al. | | |
| 2020/0163010 A1* | 5/2020 | Qiao | ...................... | H04W 48/18 |
| 2021/0377720 A1* | 12/2021 | Wang | ...................... | H04W 8/08 |
| 2022/0240213 A1* | 7/2022 | Ly | .......................... | H04W 4/90 |

FOREIGN PATENT DOCUMENTS

| | | |
|---|---|---|
| CN | 109964509 A | 7/2019 |
| EP | 3229530 A1 | 10/2017 |
| EP | 3358887 A1 | 8/2018 |
| KR | 20190058371 A | 5/2019 |
| WO | 2018137769 A1 | 8/2018 |
| WO | 2018230941 A1 | 12/2018 |
| WO | 2018233436 A1 | 12/2018 |

OTHER PUBLICATIONS

3GPP TS 23.501 V16.2.0 (Sep. 2019), "3rd Generation Partnership Project; Technical Specification Group Services and System Aspects; System Architecture for the 5G System (5GS); Stage 2," Sep. 2019, 389 pages.

3GPP TS 23.502 V16.2.0 (Sep. 2019), "3rd Generation Partnership Project; Technical Specification Group Services and System Aspects; Procedures for the 5G System (5GS); Stage 2 (Release 16)," Sep. 2019, 525 pages.

3GPP TS 33.501 V16.0.0 (Sep. 2019), "3rd Generation Partnership Project; Technical Specification Group Services and System Aspects; Security Architecture and Procedures for 5G System (Release 16)," Sep. 2019, 196 pages.

EP Partial Supplementary European Search Report issued in European Application No. 20872702.4 on Oct. 25, 2022, 16 pages.

Ericsson, "Harmonized Solution for Support of Non-Public Networks," 3GPP TSG-SA WG2 Meeting #132, S2-1903385, Xi'an, China, Apr. 8-12, 2019, 37 pages.

Huawei et al., "New Solution UE on-boarding and provisioning for NPN," SA WG2 Meeting #136, S2-1911668 (S2-1911669), Reno, USA, Nov. 18-22, 2019, 7 pages.

Office Action issued in Chinese Application No. 201910945824.9 on Nov. 29, 2021, 16 pages (with English translation).

PCT International Search Report and Written Opinion issued in International Application No. PCT/CN2020/119660, dated Dec. 30, 2020, 15 pages (with English translation).

Samsung, "NPN Subscription Data Provisioning," SA WG2 Meeting #132, S2-1903581, Xi'an, China, Apr. 8-12, 2019, 11 pages.

Samsung et al., "Update on Solution #4 for Access to Non-Public Networks," SA WG2 Meeting #129, S2-1811025, Dongguan, China, Oct. 15-19, 2018, 7 pages.

Extended European Search Report in European Appln No. 20872702.4, dated Mar. 13, 2023, 15 pages.

* cited by examiner

PERFORMING A RESTRICTED REGISTRATION IN A WIRELESS COMMUNICATION NETWORK

CROSS-REFERENCE TO RELATED APPLICATIONS

This application is a continuation of International Application No. PCT/CN2020/119660, filed on Sep. 30, 2020, which claims priority to Chinese Patent Application No. 201910945824.9, filed on Sep. 30, 2019. The disclosures of the aforementioned applications are hereby incorporated by reference in their entireties.

TECHNICAL FIELD

This application relates to the field of mobile communication technologies, and in particular, to a communication method and an apparatus applied to a third-party subscription data configuration scenario.

BACKGROUND

Currently, there are a plurality of types of public land mobile networks (public land mobile networks, PLMNs) that a user can access, for example, a long term evolution (long term evolution, LTE) communication network. These public land mobile networks provide a service data transmission channel for a call service, a video service, a web page service, and the like of the user. However, with the explosive development of new services such as internet of vehicles, virtual reality, mobile office, and internet of things, a mobile network is required to provide consistent services in a plurality of scenarios, such as fiber-like access rate, low-latency user experience, connection capability of hundreds of billions of devices, ultra-high traffic density, ultra-high connection density, and ultra-high mobility. To this end, the 3rd generation partnership project (3rd generation partnership project, 3GPP) proposes a 5th generation (5th generation, 5G) communication network. Next Gen (or NG) is short for a next-generation (5G) mobile communication system architecture, and includes UE, an AN, a core, and a data network. The UE, the AN, and the core are main components of the architecture.

With development of requirements, the 3GPP proposes a non-public network (Non-public network, NPN). The NPN may be understood as a private network in a 5G network that supports only access of a private network user, and is a 5G network that is not deployed for public use. It may be implemented dependent on support of a 5G PLMN or independent of network functions of a 5G PLMN. In the former case, the NPN may be implemented by using a network slice in the 5G PLMN. To prevent an unauthorized UE from attempting to access and selecting the NPN, a CAG function is additionally used. In the latter case, the NPN network (5G network) is independently deployed and does not depend on the 5G PLMN network. The NPN network is identified by using a 5G PLMN ID+an NID, where the NID is a network identifier, and the PLMN ID may be an inherent value reserved by a third-party operator, or may be a specific value of a PLMN operator that deploys the NPN.

The NPN network needs to support online registration of a terminal device. To be specific, when the terminal device is initially enabled, third-party subscription data is configured on the terminal device through the NPN network. The third-party subscription data is located in a third-party configuration server independent of the NPN network. However, in a conventional technology, there is no mechanism for a network to perform management and control of UE on which the third-party subscription data needs to be configured.

SUMMARY

This application provides a communication method and an apparatus, to implement management and control of a terminal device by a network.

According to a first aspect, this application provides a communication method, including. An access management network element receives a registration request from a terminal device. The access management network element obtains configuration type indication information, and determines to perform restricted registration based on the configuration type indication information. The access management network element starts a restricted registration timer. After the restricted registration timer expires, the access management network element initiates a deregistration procedure to deregister the terminal device from a network.

It can be known from the foregoing descriptions that, registration duration of the terminal device is restricted by the restricted timer. If the terminal device does not deregister from the network within time restricted and allowed by the restricted timer, the network forces the terminal device to deregister, to prevent the terminal device from maliciously camping or accessing another service for a long time. This solution is simple to implement, and easy to deploy and implement.

In a possible implementation, that the access management network element obtains configuration type indication information includes:

the access management network element obtains the configuration type indication information from the registration request, or the access management network element obtains the configuration type indication information from an N2 message from an access network element, where the N2 message includes the registration request, or the access management network element requests user subscription data of the terminal device from a data management network element, and receives the configuration type indication information returned by the data management network element.

In a possible implementation, before that the access management network element starts a restricted registration timer, the method includes: The access management network element obtains a restricted policy, and determines the restricted registration timer based on restricted registration timer information in the restricted policy. The access management network element obtains the restricted policy in one or more of the following manners: obtaining the restricted policy from the data management network element, obtaining the restricted policy that is locally configured, or obtaining the restricted policy from a PCF.

In a possible implementation, the method further includes: The access management network element determines duration of a periodical registration timer or a mobile reachable timer based on duration of the restricted registration timer, where the duration of the periodical registration timer or the mobile reachable timer is less than or equal to the duration of the restricted registration timer.

In a possible implementation, the method further includes: The access management network element determines duration of the restricted registration timer based on duration of a periodical registration timer or a mobile reachable timer, where the duration of the periodical registration timer or the mobile reachable timer is less than or equal to the duration of the restricted registration timer.

In a possible implementation, the method further includes: The access management network element receives a NAS message from the terminal device, where the non-access stratum (NAS) message includes a session establishment request used to request to establish a first session.

In a possible implementation, the NAS message further includes data network name (DNN) information that the terminal device requests to access, the restricted policy includes allowed DNN information, and the method further includes: The access management network element determines whether the DNN information that the terminal device requests to access meets the allowed DNN information, and if the DNN information that the terminal device requests to access meets the allowed DNN information, performs an establishment procedure of the first session.

In a possible implementation, the restricted policy includes SMF selection information, and the method further includes: The access management network element selects, based on the SMF selection information, an SMF to provide a service for the first session.

In a possible implementation, the restricted policy includes a roaming policy, and the method further includes: The access management network element determines that a roaming mode supported by the first session is a local breakout mode or a home routed mode according to the roaming policy, and selects, based on the supported roaming mode, the SMF to provide the service for the first session.

In a possible implementation, the restricted policy includes an allowed quantity of sessions, and the method further includes:

The access management network element determines that a quantity of sessions established by the terminal device is equal to or greater than the allowed quantity of sessions, and the access management network element rejects the NAS message.

According to a second aspect, this application provides a communication method, including: A terminal device sends a registration request to a network to register with the network. The terminal device sends a session establishment request to the network to establish a first session. The terminal device receives third-party subscription data from a third-party configuration server by using the first session. After receiving the third-party subscription data, the terminal device initiates a session release procedure and a deregistration procedure. The terminal device re-registers with the network by using the third-party subscription data.

It can be learned from the foregoing descriptions that after receiving the third-party subscription data, the terminal device initiates the session release procedure and the deregistration procedure, and re-registers with the network by using the third-party subscription data, to prevent the terminal device from camping on the network for a long time.

In a possible implementation, the registration request carries a configuration type indication, and the configuration type indication is used to indicate that the registration is restricted registration.

In a possible implementation, the terminal device sends the registration request to the network by using a radio resource control RRC access message, where the RRC access message carries a configuration type indication, and the configuration type indication is used to indicate that the registration is restricted registration.

In a possible implementation, the terminal device sends the session establishment request to the network by using a NAS message, where the NAS message includes a DNN that the terminal device requests to access, and the DNN that the terminal device requests to access is a restricted DNN.

In a possible implementation, the session establishment request message includes a service provider identifier SP-ID.

According to a third aspect, this application provides a communication method, including: A data management network element receives a request sent by an access management network element for obtaining user subscription data, where the request carries a user identifier. The data management network element determines that the user subscription data corresponding to the user identifier is configuration subscription data. The data management network element sends a configuration type indication to the access management network element, where the configuration type indication is used to indicate that the registration is restricted registration.

It can be known from the foregoing descriptions that, the data management network element determines that the user subscription data corresponding to the user identifier is the configuration subscription data. The data management network element sends the configuration type indication to the access management network element, where the configuration type indication is used to indicate that the registration is the restricted registration, so that the access management network element subsequently performs restricted registration management, to prevent the terminal device from maliciously camping or accessing another service for a long time. This solution is simple to implement, and easy to deploy and implement.

In a possible implementation, the user subscription data corresponding to the user identifier includes indication information, where the indication information indicates that the user subscription data is the configuration subscription data.

In a possible implementation, the data management network element obtains a restricted policy, and sends the restricted policy to the access management network element, where the restricted policy includes restricted registration timer information, and the restricted registration timer information is used to determine a restricted timer.

In a possible implementation, if the user subscription data is shared subscription data, the method includes: The data management network element obtains a device identity of a terminal device, and determines, based on the device identity of the terminal device and a usage record in the shared subscription data, whether the terminal device is allowed to use the shared subscription data, where the usage record includes a usage history of a registered terminal device; and if not allowed, notifies the access management element to reject the terminal device.

In a possible implementation, the determining, based on the device identity of the terminal device and a usage record in the shared subscription data, whether the terminal device is allowed to use the shared subscription data includes:
   if the terminal device is determined as an unregistered terminal device, the terminal device is allowed to use the shared subscription data, or
   if the terminal device is determined as a registered terminal device, the terminal device is not allowed to use the shared subscription data; and
   if a quantity of registration times of the terminal device does not exceed a threshold, the terminal device is allowed to use the shared subscription data, or
   if a quantity of registration times of the terminal device exceeds a threshold, the terminal device is not allowed to use the shared subscription data.

In a possible implementation, the restricted policy further includes a combination of one or more of the following information: allowed DNN information, session management network element/user plane network element selection information, a roaming policy, an allowed quantity of sessions, or allowed QoS parameter information.

According to a fourth aspect, this application provides an apparatus. The apparatus may be an access management network element, or may be a chip or a circuit. The apparatus has a function of implementing any one of the first aspect or the possible implementations of the first aspect and each embodiment. The function may be implemented by using hardware, or may be implemented by hardware executing corresponding software. The hardware or software includes one or more modules corresponding to the foregoing function.

According to a fifth aspect, this application provides an apparatus, including a processor and a memory. The memory is configured to store instructions. When the apparatus runs, the processor executes the instructions stored in the memory, to enable the apparatus to perform the communication method according to any one of the first aspect or the implementations of the first aspect. It should be noted that the memory may be integrated into the processor, or may be independent of the processor.

According to a sixth aspect, this application provides an apparatus. The apparatus includes a processor. The processor is configured to: couple to a memory, read instructions in the memory, and perform, according to the instructions, the communication method according to any one of the first aspect or the implementations of the first aspect.

According to a seventh aspect, this application provides an apparatus. The apparatus may be a terminal device, or may be a chip or a circuit. The apparatus has a function of implementing any one of the second aspect or the possible implementations of the second aspect and each embodiment. The function may be implemented by using hardware, or may be implemented by hardware executing corresponding software. The hardware or software includes one or more modules corresponding to the foregoing function.

According to an eighth aspect, this application provides an apparatus, including a processor and a memory. The memory is configured to store instructions. When the apparatus runs, the processor executes the instructions stored in the memory, to enable the apparatus to perform the communication method according to any one of the second aspect or the implementations of the second aspect. It should be noted that the memory may be integrated into the processor, or may be independent of the processor.

According to a ninth aspect, this application provides an apparatus. The apparatus includes a processor. The processor is configured to: couple to a memory, read instructions in the memory, and perform, according to the instructions, the communication method according to any one of the second aspect or the implementations of the second aspect.

According to a tenth aspect, this application provides an apparatus. The apparatus may be a terminal device, or may be a chip or a circuit. The apparatus has a function of implementing any one of the third aspect or the possible implementations of the third aspect and each embodiment. The function may be implemented by using hardware, or may be implemented by hardware executing corresponding software. The hardware or software includes one or more modules corresponding to the foregoing function.

According to an eleventh aspect, this application provides an apparatus, including a processor and a memory. The memory is configured to store instructions. When the apparatus runs, the processor executes the instructions stored in the memory, to enable the apparatus to perform the communication method according to any one of the third aspect or the implementations of the third aspect. It should be noted that the memory may be integrated into the processor, or may be independent of the processor.

According to a twelfth aspect, this application provides an apparatus. The apparatus includes a processor. The processor is configured to: couple to a memory, read instructions in the memory, and perform, according to the instructions, the communication method according to any one of the third aspect or the implementations of the third aspect.

According to a thirteenth aspect, this application further provides a readable storage medium, where the readable storage medium stores a program or instructions. When the program or the instructions are run on a computer, the communication method in the foregoing aspects is performed.

According to a fourteenth aspect, this application further provides a computer program product including instructions. When the computer program product runs on a computer, the computer is enabled to perform the communication method in the foregoing aspects.

According to a fifteenth aspect, this application further provides a system. The system includes an access management network element, where the access management network element may be configured to perform the steps performed by the access management network element in the first aspect, any method in the first aspect, or the solutions provided in embodiments of this application.

In a possible design, the system may further include a data management network element, where the data management network element may be configured to perform the steps performed by the data management network element in the third aspect, any method in the third aspect, or the solutions provided in embodiments of this application.

In a possible design, the system may further include another device that interacts with the access management network element and/or the data management network element in the solutions provided in embodiments of this application, for example, an SMF, a PCF, or a terminal device.

These aspects or other aspects of this application are clearer and more comprehensible in descriptions of the following embodiments.

DESCRIPTION OF EMBODIMENTS

Figure 1:
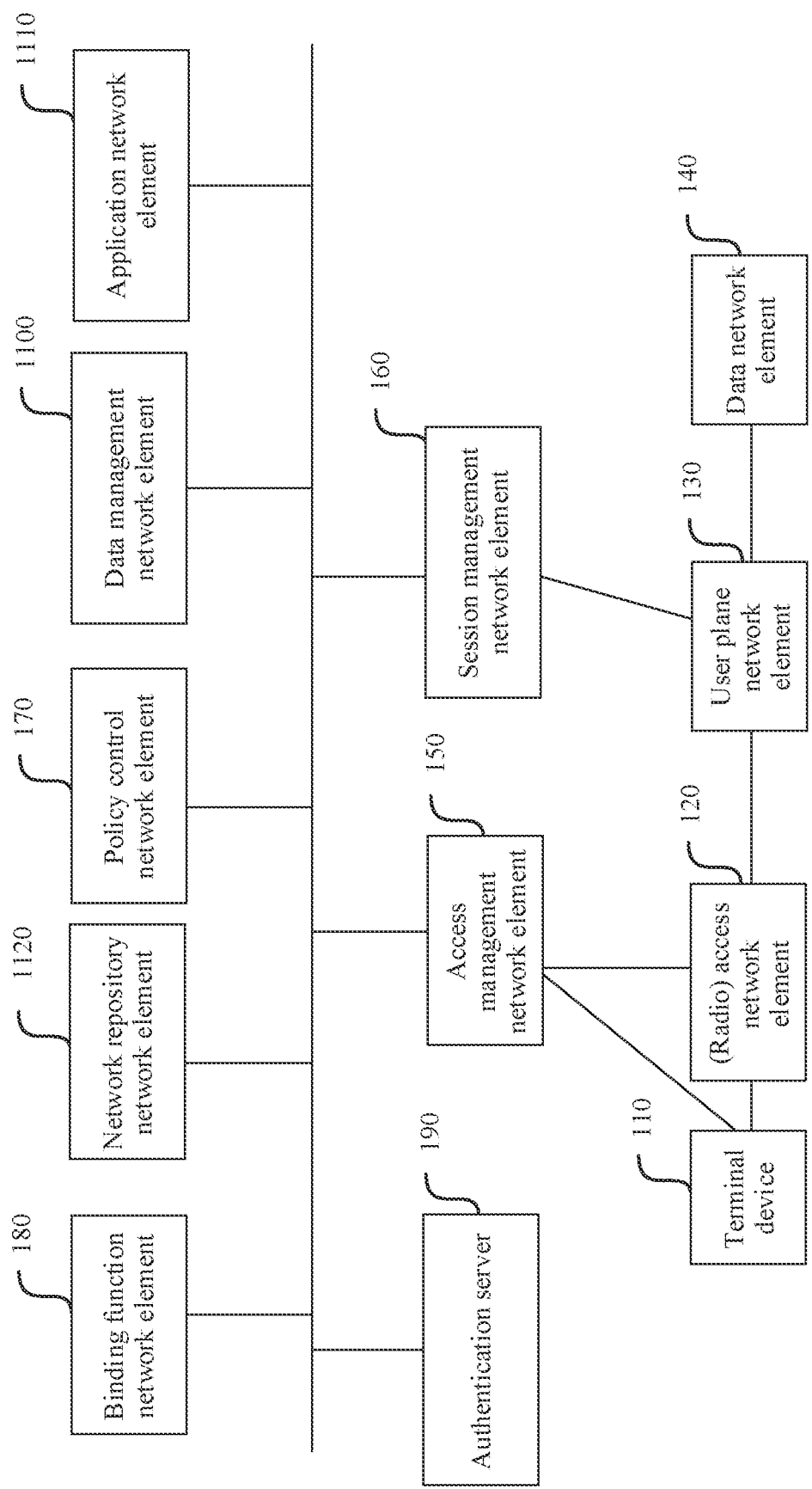
FIG. 1 is a schematic diagram of a possible network architecture according to this application.

The technical solutions in embodiments of this application are described below with reference to the accompanying drawings in embodiments of this application. In descriptions of this application, unless otherwise specified, "/" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A or B may be singular or plural. In addition, in the descriptions of this application, "a plurality of" means two or more than two, unless otherwise specified. "At least one" means one or more, and "a plurality of" means two or more. The term "at least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

Currently, a concept of an NPN network is proposed in the communication field. The NPN network (a non-public network, also referred to as a private network) is a concept proposed for distinguishing from a PLMN network (a public network). The NPN network can be understood as a privately owned network, for example, an internal network built by a company, a school, or a factory. A terminal device that does not subscribe to the NPN network is not allowed to access the NPN network. The PLMN network is usually a network operated by an operator and satisfying a requirement of the 3rd generation partnership project (3rd generation partnership project, 3GPP) standard, and is referred to as a 3GPP network for short. Usually, the 3GPP network includes but is not limited to a 5th generation mobile communication technology (5th generation, 5G) network, a 4th generation mobile communication technology (4th generation, 4G) network, a 3rd generation mobile communication technology (3rd generation, 3G) network, a 2nd generation wireless telephone technology (2-generation wireless telephone technology, 2G) network, or the like. It should be noted that the NPN network may also be constructed based on the requirement of the 3GPP standard. It may be understood that the NPN network may also be a 3GPP network. A method provided in embodiments of this application is applicable to both the NPN network and the public network. In this application, descriptions are provided mainly by using an example in which the method is applied to the NPN network.

FIG. 1 shows an example of a communication system according to an embodiment of this application. Refer to FIG. 1. The communication system provided in this embodiment of this application may usually include the following devices, network elements, and networks:

1. A terminal device 110 may include various handheld devices, vehicle-mounted devices, wearable devices, computing devices that have a wireless communication function, or other processing devices connected to a wireless modem, and various forms of terminals, for example, a mobile station (mobile station, MS), a terminal (terminal), user equipment (user equipment, UE), and a soft client. For example, the terminal device 110 may be a water meter, an electricity meter, or a sensor.

2. A (radio) access network (radio access network, RAN) network element 120 is configured to provide a network access function for authorized terminals in a specific area, and can use transmission tunnels with different quality based on levels of the terminals, service requirements, and the like. The RAN network element can manage a radio resource and provide an access service for the terminal, to forward a control signal and terminal data between the terminal and a core network. The network element may also be understood as a base station in a conventional network.

A RAN network element in the NPN network can further control an unauthorized terminal device to attempt to access or select the NPN network.

3. A user plane network element 130 is used for packet routing and forwarding, quality of service (quality of service, QoS) processing on user plane data, and the like. In a 5G communication system, the user plane network element may be a user plane function (user plane function, UPF) network element. In a future communication system, the user plane network element may still be the UPF network element, or may have another name. This is not limited in this application.

4. A data network element 140 is configured to provide a network for data transmission. In the 5G communication system, the data network element may be a data network (data network, DN) element. In the future communication system, the data network element may still be the DN network element, or may have another name. This is not limited in this application.

5. An access management network element 150 is mainly used for mobility management, access management, and the like, and may be configured to implement functions, for example, lawful interception and access authorization/authentication, other than session management in functions of a mobility management entity (mobility management entity, MME). In the 5G communication system, the access management network element may be an access and mobility management function (access and mobility management function, AMF) network element. In the future communication system, the access management network element may still be the AMF network element, or may have another name. This is not limited in this application.

6. A session management network element 160 is mainly configured to manage a session, assign and manage an internet protocol (internet protocol, IP) address of a terminal device, select and manage an endpoint of a user plane function interface and a policy control and charging function interface, notify downlink data, and the like. In the 5G communication system, the session management network element may be a session management function (session management function, SMF) network element. In the future communication system, the session management network element may still be the SMF network element, or may have another name. This is not limited in this application.

7. A policy control network element 170 is configured to guide a unified policy framework of network behavior, and provide policy rule information for a control plane function network element (for example, the AMF or SMF network element), and the like. In a 4G communication system, the policy control network element may be a policy and charging rules function (policy and charging rules function, PCRF) network element. In the 5G communication system, the policy control network element may be a policy control function (policy control function, PCF) network element. In the future communication system, the policy control network element may still be the PCF network element, or may have another name. This is not limited in this application.

8. A binding function network element 180 is configured to search for a PCF associated with a session. In the 5G communication system, the binding support network element may be a binding support function (binding support function, BSF) network element. In the future communication system, the binding support network element may still be the BSF network element, or may have another name. This is not limited in this application.

9. An authentication server 190 is configured to authenticate a service, generate a key to implement two-way authentication for a terminal device, and support a unified authentication framework. In the 5G communication system, the authentication server may be an authentication server function (authentication server function, AUSF) network element. In the future communication system, the authentication server function network element may still be the AUSF network element, or may have another name. This is not limited in this application.

10. A data management network element 1100 is configured to process a terminal device identity, perform access authentication, registration, and mobility subscription management, and the like. In the 5G communication system, the data management network element may be a unified data management (unified data management, UDM) network element. In the future communication system, the unified data management may still be the UDM network element, or may have another name. This is not limited in this application.

11. An application network element 1110 is configured to perform application-affected data routing, access a network exposure function network element, interact with a policy framework to perform policy control, and the like. In the 5G communication system, the application network element may be an application function (application function, AF) network element. In the future communication system, the application network element may still be the AF network element, or may have another name. This is not limited in this application.

12. A network repository network element 1120 is configured to maintain real-time information of all network function entities and services in a network. In the 5G communication system, the network repository network element may be a network registration function (network repository function, NRF) network element. In the future communication system, the network repository network element may still be the NRF network element, or may have another name. This is not limited in this application.

It should be noted that embodiments of this application are not limited to the foregoing system architecture, and may alternatively be applied to another future communication system, for example, a 6th generation communication (6th generation, 6G) system architecture. In addition, in embodiments of this application, names of the foregoing used network elements may be changed while functions of the network elements may remain the same in the future communication system.

In addition, although not shown in FIG. 1, the communication system may further include another network element, device, network entity, or network subsystem, for example, a binding support function (binding support function, BSF) network element. Details are not described in embodiments of this application.

Optionally, various network elements in embodiments of this application may be a communication device, or may be a chip, a chip system, or the like that can be used in the communication device. This is not limited in embodiments of this application.

It should be noted that the foregoing network elements may be different communication devices, or may be different communication apparatuses, modules, or subsystems in a same communication device. This is not limited in embodiments of this application.

Optionally, the terminal device (terminal) in embodiments of this application may be a device configured to implement a wireless communication function, for example, a terminal device or a chip that may be used in the terminal device. The terminal device may be user equipment (user equipment, UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. An access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a virtual reality (virtual reality, VR) terminal device, an augmented reality (augmented reality, AR) terminal device, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. The terminal may be mobile or at a fixed location.

Optionally, the access network device in embodiments of this application generally includes a device configured to access a core network, for example, a base station, a broadband network gateway (broadband network gateway, BNG), an aggregation switch, or a non-3rd generation partnership project (3rd generation partnership project, 3GPP) access device. The base station may include base stations in various forms, for example, a macro base station, a micro base station (also referred to as a small cell), a relay station, and an access point.

Optionally, each network element, network device, or terminal device in embodiments of this application may also be referred to as a communication apparatus. The communication apparatus may be a general-purpose device or a special-purpose device. This is not specifically limited in embodiments of this application.

Optionally, a related function of the policy control network element or the network device in embodiments of this application may be implemented by one device, or may be jointly implemented by a plurality of devices, or may be implemented by one or more functional modules in one device. This is not specifically limited in embodiments of this application. It may be understood that the foregoing function may be a network element in a hardware device, or a software function running on special-purpose hardware, or a combination of hardware and software, or a virtualization function instantiated on a platform (for example, a cloud platform).

Further, the AMF network element may be briefly referred to as an AMF, the SMF network element may be briefly referred to as an SMF, and the UDM network element may be briefly referred to as a UDM. That is, each AMF may be replaced with an access management network element, each SMF may be replaced with a session management network element, and each UDM may be replaced with a data management network element described below in this application. Other network elements are similar.

For ease of description, in this application, a method for UPF selection or SMF selection is described by using an example in which an apparatus is an AMF entity, an SMF entity, or a UDM entity. For an implementation method in which the apparatus is a chip in the AMF entity, a chip in the SMF entity, or a chip in the UDM entity, refer to specific descriptions in which the apparatus is the SMF entity, the AMF entity, or an NRF entity. Details are not described again.

A user performs subscription with a third party, but third-party subscription data is not configured when a terminal device used by the user is set at delivery, where the third-party subscription data is located in a third-party configuration server independent of an NPN network. Therefore, when the terminal device is initially enabled, the terminal device needs to obtain the third-party subscription data by using the NPN network. For this type of terminal device that needs to obtain the third-party subscription data, the NPN may allow the terminal device to register with a network and obtain the third-party subscription data, but needs to manage and control the terminal device, for example, detach the terminal device from the network in a timely manner, to prevent the terminal device from maliciously camping for a long time or forbid the terminal device to access another service. To resolve the foregoing problem, this application provides a communication method, apparatus, and system. For specific content, refer to descriptions in subsequent embodiments.

First, different types of user subscription data are described as follows:

Private subscription data: The user subscription data is allowed to be used by a single terminal device, for example, a subscriber identity module (subscriber identity module, SIM) card mode currently used in the market.

Shared subscription data: The shared subscription data is subscription data that can be shared by a plurality of terminal devices. For example, if a user is served by a plurality of terminal devices, the plurality of terminal devices share same subscription data.

Configuration subscription data. The terminal device uses the user subscription data to access the network. The network allows the terminal device to perform configuration, but forbids the terminal device to access a service.

Service subscription data: The terminal device uses the user subscription data to access the network. The network allows the terminal device to update subscription data, and the terminal device can properly access the service.

There may be a plurality of types of user subscription data at the same time. For example, the user subscription data may be shared subscription data and configuration subscription data, indicating the user subscription data jointly used by a plurality of terminal devices after a user subscribes, and a network side allows the terminal device to perform configuration, but forbids the terminal device to access the service.

Figure 2A:
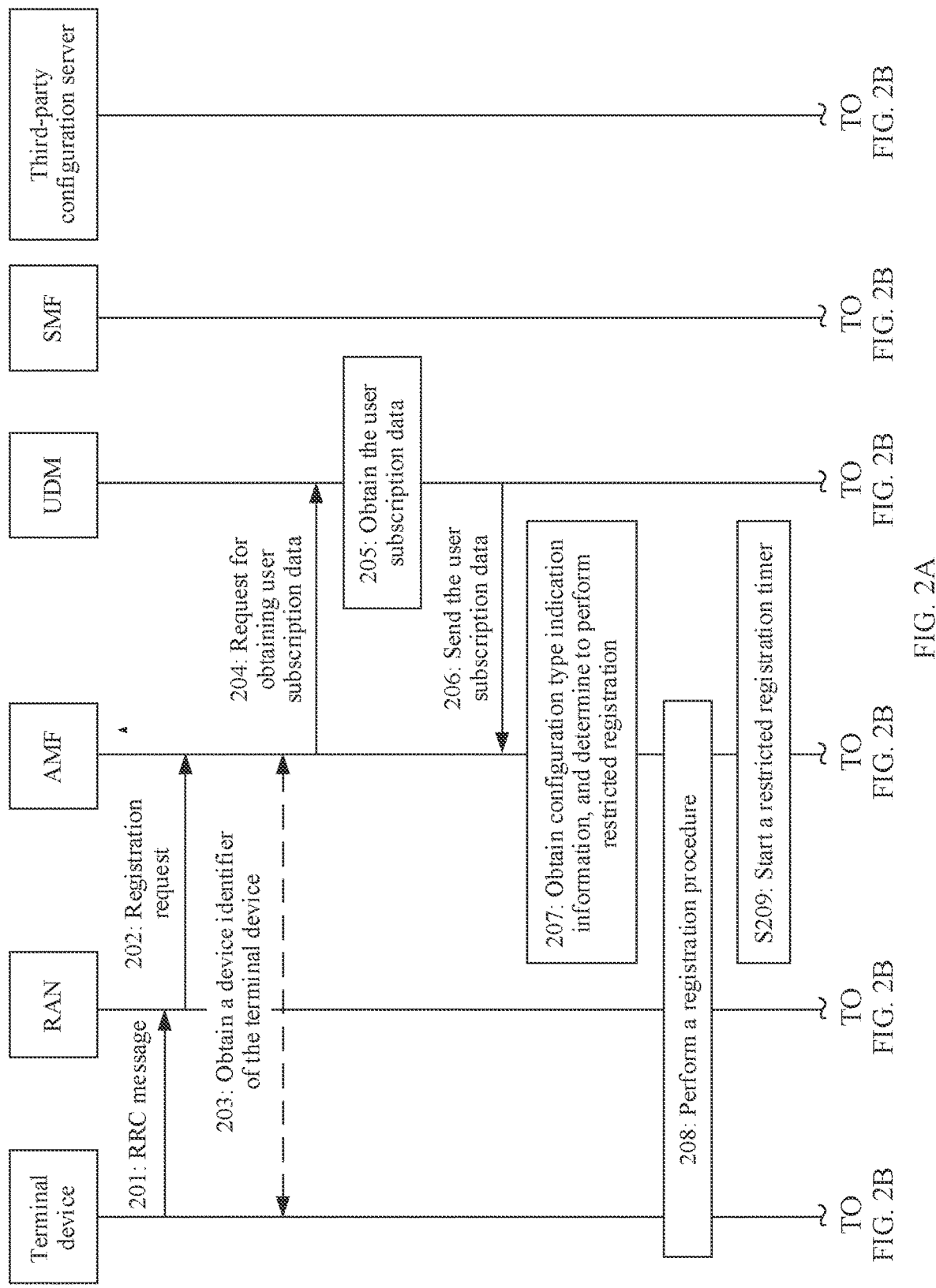
FIG. 2A and FIG. 2B are schematic diagrams of a communication method according to this application.
Figure 2B:
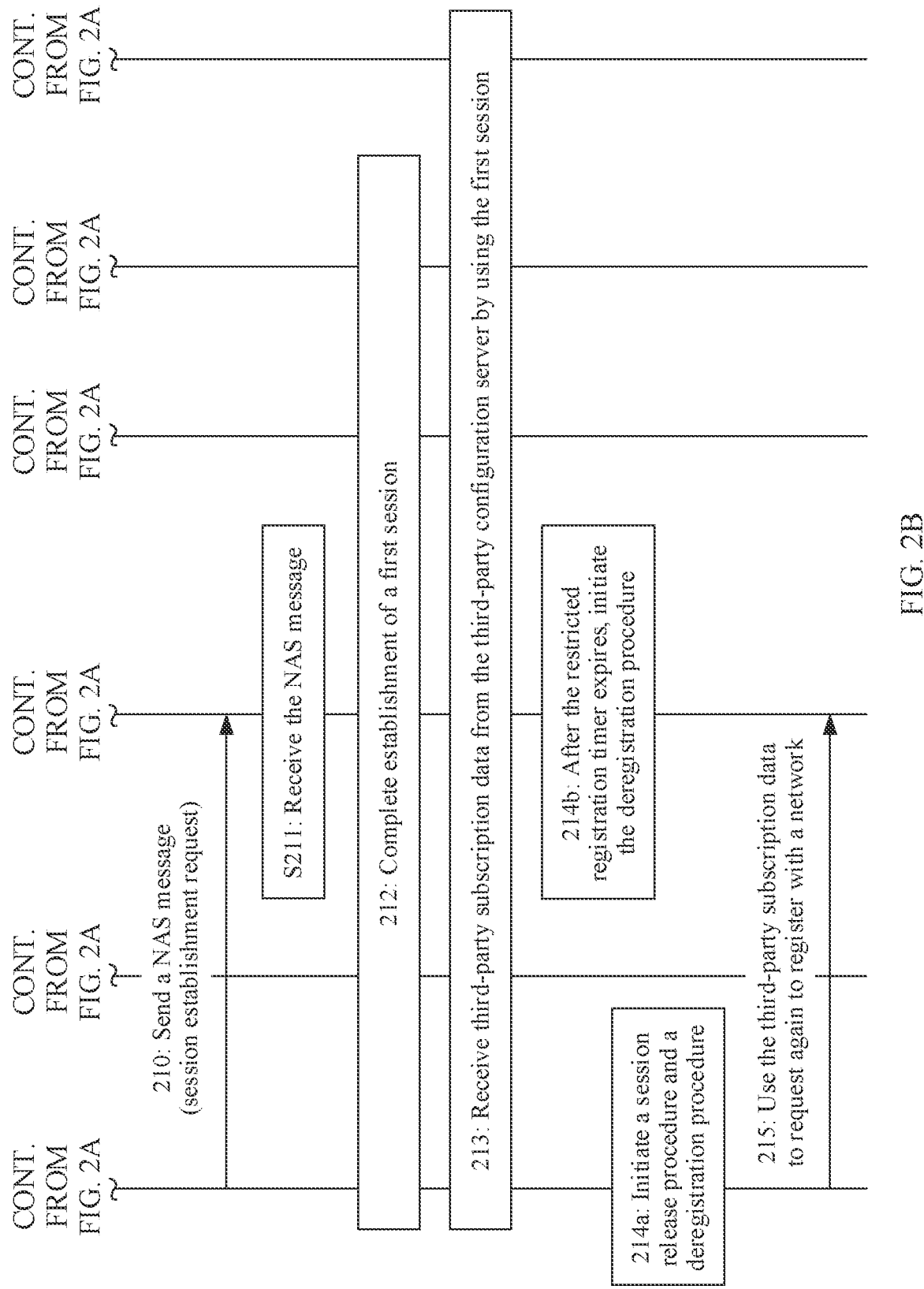

Based on the network architecture in FIG. 1, FIG. 2A and FIG. 2B show a communication method provided in this application. The communication method may be used to resolve the foregoing problem. A terminal device initiates a registration procedure to register with a network. An AMF starts a restricted registration timer, and allows the terminal device, within time of the restricted registration timer, to establish a session, interact with a third-party configuration server, and obtain third-party subscription data. After the terminal device completes configuration of the third-party subscription data, the terminal device may actively release the session and perform deregistration. Alternatively, after the restricted registration timer expires, the AMF initiates a deregistration procedure to deregister the terminal device from the network. The method includes the following steps;

Step 201: The terminal device sends a registration request to the network. Specifically, the terminal device sends a radio resource control (radio resource control, RRC) message to a RAN, where the RRC message includes the registration request.

The registration request carries a user identifier, where the user identifier is an identifier that can uniquely indicate a user, for example, may be any one or more of the following: a mobile station international ISDN number (mobile station international ISDN number, MSISDN), a public subscription identifier (generic public subscription identifier, GPSI), an international mobile subscriber identity (international mobile subscriber identity, IMSI), a subscription permanent identifier (subscription permanent identifier, SUPI), and a subscription concealed identifier (Subscription Concealed Identifier, SUCI). If user subscription data corresponding to the user identifier is shared subscription data, a plurality of terminal devices may include a same user identifier in the registration request.

Optionally, the registration request further includes configuration type indication information. The configuration type indication information is used to indicate that the registration is restricted registration (or special registration, configuration registration, online signup (Online Signup) subscription registration, or the like), that is, notify a subsequent network element (for example, an AMF) to perform restricted registration. The configuration type indication information includes any one or more of the following: a registration type value set to restricted registration, an indication used to indicate that the terminal device supports restricted registration (an indication indicating a capability of the terminal device), an information element used to indicate that restricted registration is performed, or an identifier of the terminal device that is set to a special value.

Optionally, the RRC message further includes configuration type indication information.

Step 202: The RAN receives the RRC message, selects an AMF, and sends the registration request to the selected AMF. Correspondingly, the AMF receives the registration request from the terminal device.

Specifically, the RAN sends an N2 message to the AMF, where the N2 message includes the registration request. Correspondingly, the AMF receives the N2 message sent by the RAN, where the N2 message includes the registration request.

Optionally, if the RRC message includes the configuration type indication information, the N2 message may further include the configuration type indication information. That is, the RAN adds the configuration type indication information to the N2 message.

Optionally, if the RRC message includes the configuration type indication information, the RAN may specifically select, based on a configuration type indication, an AMF that supports restricted registration.

Step 203: Optionally, the AMF obtains a device identity of the terminal device from the terminal device.

The device identity of the terminal device may identify a terminal device that accesses a 5G network, and may be an identifier configured at delivery of the terminal device. For example, the device identity of the terminal device may be any one or more of the following: a permanent equipment identifier (permanent equipment identifier, PEI), an international mobile equipment identity (international mobile equipment identity, IMEI), or an international mobile equipment identity software version (international mobile equipment identity software version, IMEISV).

Specifically, the AMF may obtain the device identity of the terminal device by using an identity request/response message. To be specific, the AMF sends the identity request message to the terminal device, to request to obtain the device identity of the terminal device. The terminal device returns the identity request response message including the device identity (for example, the PEI).

Step 204: The AMF sends a request for obtaining the user subscription data to the UDM, where the request for obtaining the user subscription data includes the user identifier.

Optionally, the request for obtaining user subscription data further includes the device identity of the terminal device.

Specifically, the AMF sends the foregoing information to the UDM by using an Nudm_SDM_Get request message.

Step 205: The UDM obtains user subscription data corresponding to the user identifier.

Step 205 may further include one or more of the following optional steps:

Step 205a: Optionally, the UDM determines that the user subscription data corresponding to the user identifier is configuration subscription data. The user subscription data corresponding to the user identifier includes indication information, where the indication information indicates that the user subscription data corresponding to the user identifier is the configuration subscription data. That the UDM determines, based on the indication information, that the user subscription data corresponding to the user identifier is configuration subscription data includes:

Step 205b: Optionally, the UDM determines that the user subscription data corresponding to the user identifier is the shared subscription data, and the UDM obtains the device identity of the terminal device, and determines, based on the device identity of the terminal device and a usage record of the shared subscription data, whether to allow the terminal device to use the shared subscription data, where the usage record includes a usage history of a registered terminal device. If not allowed, the AMF is notified to reject the terminal device, and for a subsequent procedure, refer to an existing procedure; or if allowed, step 206 is performed.

Specifically, the determining, based on the device identity of the terminal device and a use record of the shared subscription data, whether to allow the terminal device to use the shared subscription data may be specifically in any one of the following manners:

if the terminal device is determined as an unregistered terminal device, the terminal device is allowed to use the shared subscription data; or if the terminal device is determined as the registered terminal device, the terminal device is not allowed to use the shared subscription data;

if a quantity of registration times of the terminal device does not exceed a threshold, the terminal device is allowed to use the shared subscription data; or if a quantity of registration times of the terminal device exceeds a threshold, the terminal device is not allowed to use the shared subscription data: and if the terminal device has not been registered in a past time period, for example, within two hours, the terminal device is allowed to use the shared subscription data; or if the terminal device has been registered in a past time period, for example, within two hours, the terminal device is not allowed to use the shared subscription data.

Determining, based on the device identity of the terminal device and the usage record in the shared subscription data, whether the terminal device is allowed to use the shared subscription data can prevent a same terminal device from obtaining configuration information through restricted registration for a plurality of times without being restricted.

Step 206: The UDM sends the user subscription data corresponding to the user identifier to the AMF.

Optionally, if the UDM determines that the user subscription data corresponding to the user identifier is the configuration subscription data, the UDM sends a configuration type indication to the AMF, where the configuration type indication is used to indicate that the registration is restricted registration. For example, the configuration type indication is a newly added information element, and is used to indicate to perform restricted registration.

Optionally, if the UDM determines that the user subscription data corresponding to the user identifier is the configuration subscription data, the UDM further obtains a restricted policy, and sends the restricted policy to the AMF. The restricted policy includes restricted registration timer information, for example, duration, or a manner of setting duration of a restricted registration timer.

Specifically, the UDM sends the foregoing information to the AMF by using an Nudm_SDM_Get response message.

Step 207: The AMF obtains configuration type indication information, and determines, based on the configuration type indication information, to perform restricted registration.

A manner in which the AMF obtains the configuration type indication information may be specifically a combination of any one or more of the following manners:

Manner 1: If the registration request carries the configuration type indication information, the AMF obtains the configuration type indication information from the registration request. In this manner, there is no sequence between step 207 and steps 204 to 206.

Manner 2: If the N2 message carries the configuration type indication information, the AMF obtains the configuration type indication information from the N2 message. In this manner, there is no sequence between step 207 and steps 204 to 206.

Manner 3: The AMF requests the user subscription data from the UDM, and receives the configuration type indication information returned by the UDM. For specific content of this manner, refer to descriptions in steps 204 to 206.

208: The AMF performs a registration procedure.

209: The AMF starts the restricted registration timer.

The AMF may start the restricted registration timer in the registration procedure or after the registration procedure is completed.

Specifically, before the AMF starts the restricted registration timer, the AMF obtains the restricted policy, and determines the restricted registration timer based on the restricted registration timer information in the restricted policy. Specifically, the AMF obtains the restricted policy in one or more of the following manners: obtaining the restricted policy from the UDM, obtaining a restricted policy that is locally configured, or obtaining the restricted policy from a PCF. The restricted policy includes the restricted registration timer information. For example, the AMF obtains a first restricted policy from the UDM, or obtains a second restricted policy that is locally configured, and obtains a third restricted policy from the PCF, and the AMF determines a final restricted policy by combining one or more of the foregoing policies. The restricted policy may further include a combination of one or more of the following information: allowed DNN information, SMF selection information, a roaming policy, or a quantity of allowed sessions.

Specifically, before the AMF starts the restricted registration timer, the AMF determines duration of the restricted registration timer based on duration of a periodic registration timer or a mobile reachable timer, where the duration of the periodic registration timer or the mobile reachable timer is less than or equal to the duration of the restricted registration timer.

Optionally, the method further includes. The AMF determines the duration of the periodic registration timer or the mobile reachable timer based on the duration of the restricted registration timer, where the duration of the periodic registration timer or the mobile reachable timer is less than or equal to the duration of the restricted registration timer. That is, the AMF adjusts the duration of the periodic registration timer or mobile reachable timer based on the duration of the restricted registration timer.

An advantage that the duration of the periodic registration timer or the mobile reachable timer is less than or equal to the duration of the restricted registration timer is that mobility management update signaling of the restricted registration terminal device is reduced, network resources are saved, and network load is reduced.

Because the restricted registration timer is started, the AMF allows the terminal device, within time of the restricted registration timer, to establish a session, interact with a third-party configuration server, and obtain third-party subscription data. If the terminal device completes configuration of the third-party subscription data, the terminal device may actively release the session and perform deregistration (refer to step 214*a*). Alternatively, after the restricted registration timer expires, the AMF forces the terminal device to perform deregistration (refer to step 214*b*).

210: The terminal device initiates a session establishment procedure. Specifically, the terminal device sends a NAS message to the AMF, where the NAS message includes a session establishment request used to request to establish a first session.

Optionally, the NAS message further includes a DNN that the terminal device requests to access. Specifically, the DNN may be a restricted DNN. The restricted DNN means that the network can allow the terminal device to use or the terminal device can request to use only a service associated with the DNN, and the terminal device cannot use another service that is not associated. For example, in this embodiment, the service associated with the restricted DNN is an online configuration service. The restricted DNN may be preconfigured on the terminal device.

Optionally, the session establishment request message carries a service provider identifier (Service Provider-ID, SP-ID).

211: The AMF receives the NAS message from the terminal device, where the NAS message includes the session establishment request, and is used to request to establish the first session.

Optionally, if the NAS message further includes the DNN that the terminal device requests to access, and the restricted policy obtained by the AMF in step 206 includes the allowed DNN information, the method further includes: The AMF determines whether the DNN that the terminal device requests to access and that is in the NAS message meets the allowed DNN information (that is, determines whether the DNN that the terminal device requests to access is in the allowed DNN information). If the DNN that the terminal device requests to access and that is in the NAS message meets the allowed DNN information, the AMF sends a reject message to the terminal device. Alternatively, if the condition is met, subsequent step 213 is performed.

Optionally, if the restricted policy obtained by the AMF in step 206 includes the SMF selection information, the method further includes: The AMF selects, based on the SMF, an SMF to provide a service for the first session, for example, a restricted SMF. The restricted SMF is an SMF that supports a service associated with the restricted DNN, for example, an SMF that supports an online configuration service.

Optionally, if the restricted policy obtained by the AMF in step 206 includes a roaming policy, the method further includes: The AMF determines that a roaming mode supported by the first session is a local breakout mode or a home routed mode according to the roaming policy, and selects, based on the supported roaming mode, an SMF to provide the service for the first session. For example, when the first session supports the local breakout mode, the AMF selects a V-SMF in a serving network to provide the service for the first session. Alternatively, when the first session supports the home routed mode, the AMF selects an H-SMF in a home network to provide the service for the first session.

Optionally, if the restricted policy obtained by the AMF in step 206 includes the allowed quantity of sessions, the method further includes: The AMF determines that a quantity of sessions established by the terminal device is equal to or greater than the allowed quantity of sessions in the restricted policy, and the AMF sends the reject message to the terminal device. Optionally, the reject message may carry a cause value, to notify the terminal device that the quantity of sessions is restricted. Alternatively, if the AMF determines that the quantity of sessions established by the terminal device does not exceed the allowed quantity of sessions in the restricted policy, the AMF performs subsequent step 212.

212: The AMF performs a subsequent first session establishment procedure, to complete establishment of the first session.

Figure 4:
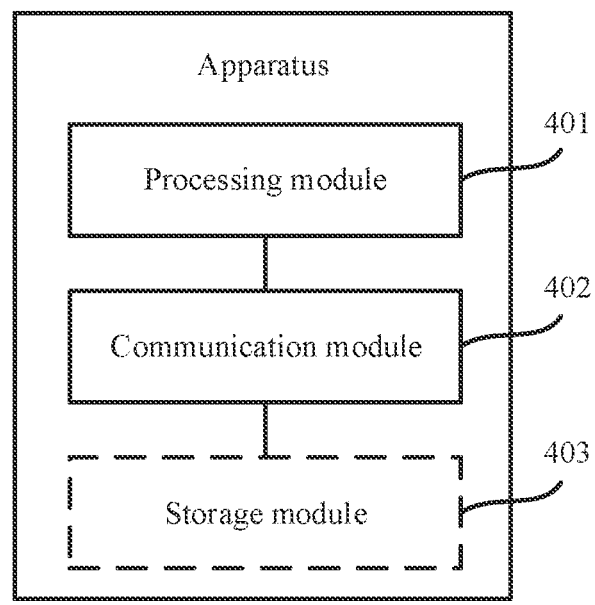
FIG. 4 is a schematic diagram of an apparatus according to this application.

Herein, reference may be made to a conventional technology, or reference may be made to the descriptions in the embodiment in FIG. 4.

213: After the first session is established, the terminal device receives the third-party subscription data from the third-party configuration server by using the first session. Subsequently, step 214*a* or 214*b* is performed.

214*a*: After receiving the third-party subscription data, the terminal device initiates a session release procedure and a deregistration procedure.

214b: After the restricted registration timer expires, the AMF initiates a deregistration procedure to deregister the terminal device from the network.

If the terminal device does not actively initiate the session release procedure and the deregistration procedure (the terminal device may also initiate another service) after receiving the third-party subscription data, the AMF may initiate the deregistration procedure to deregister the terminal device from the network after the restricted registration timer expires.

215: The terminal device uses the third-party subscription data to request again to register with the network.

Specifically, the third-party subscription data includes a subscription credential, for example, a user certificate, a device certificate, a user name, a password, or a token. In addition, the third-party subscription data may further include a service provider identifier SP-ID, used to indicate a service provider corresponding to the subscription credential. In addition, network access and selection information may further be included, for example, a network selection policy (a supported PLMN ID or PLMN ID+NPN ID, and a priority), access information (for example, a CAG list allowed to be used, and an indication that a network can be accessed only through a CAG/NPN cell), a special user identifier (used to indicate a network to perform external authentication or used by a network to query for an internal subscription to determine to perform external authentication), or indication information indicating the terminal device to construct a special user identifier.

It can be learned from the descriptions of the foregoing embodiment that a restricted timer is used to restrict duration of performing third-party subscription data configuration by the terminal device and the third-party configuration server. If the terminal device still camps on the network after allowed time is exceeded, the network forces the terminal device to deregister, to prevent the terminal device from maliciously camping or accessing another service for a long time. This solution is simple to implement, and easy to deploy and implement.

Figure 3A:
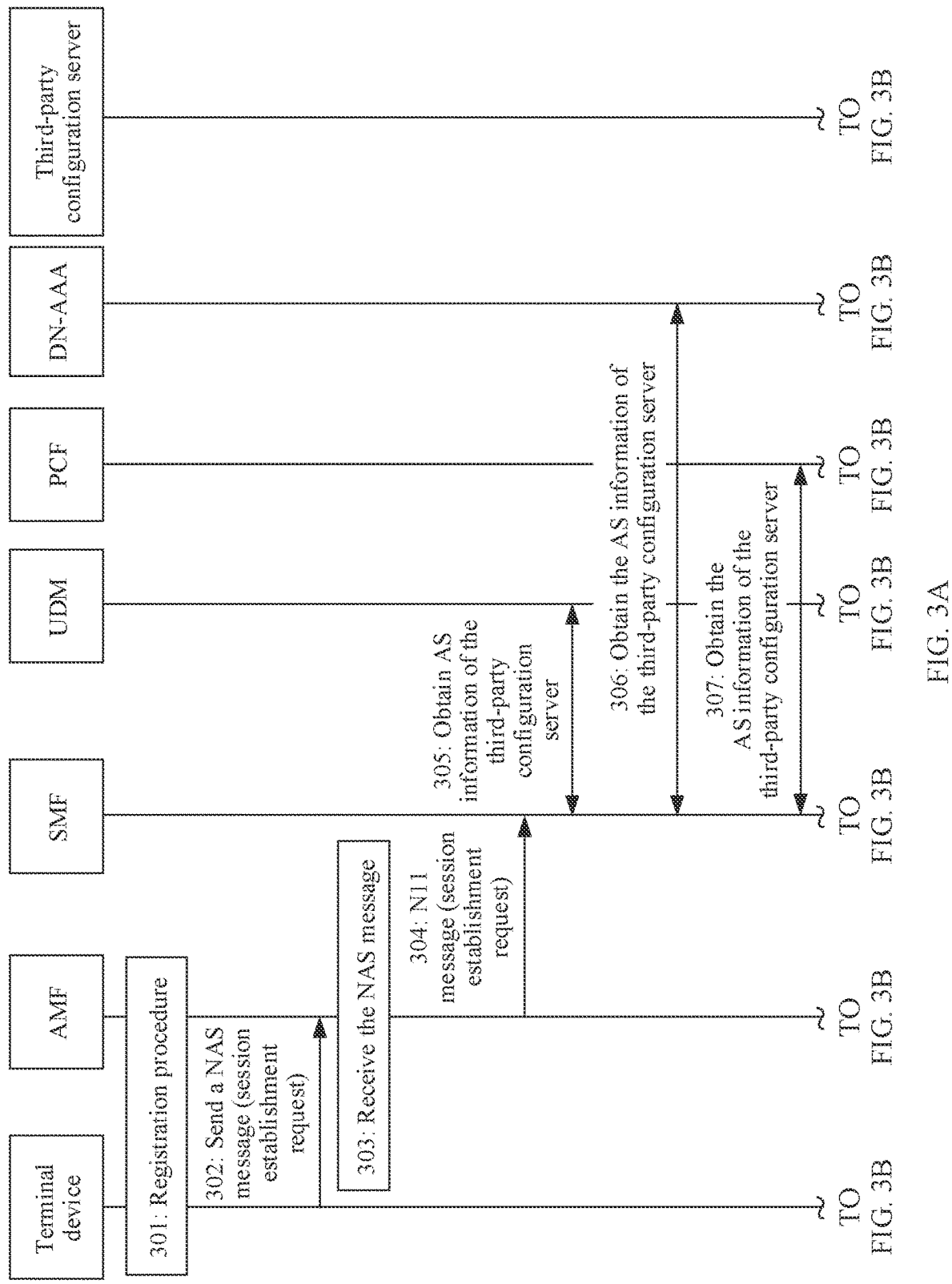
FIG. 3A and FIG. 3B are example diagrams of a communication method according to this application.
Figure 3B:
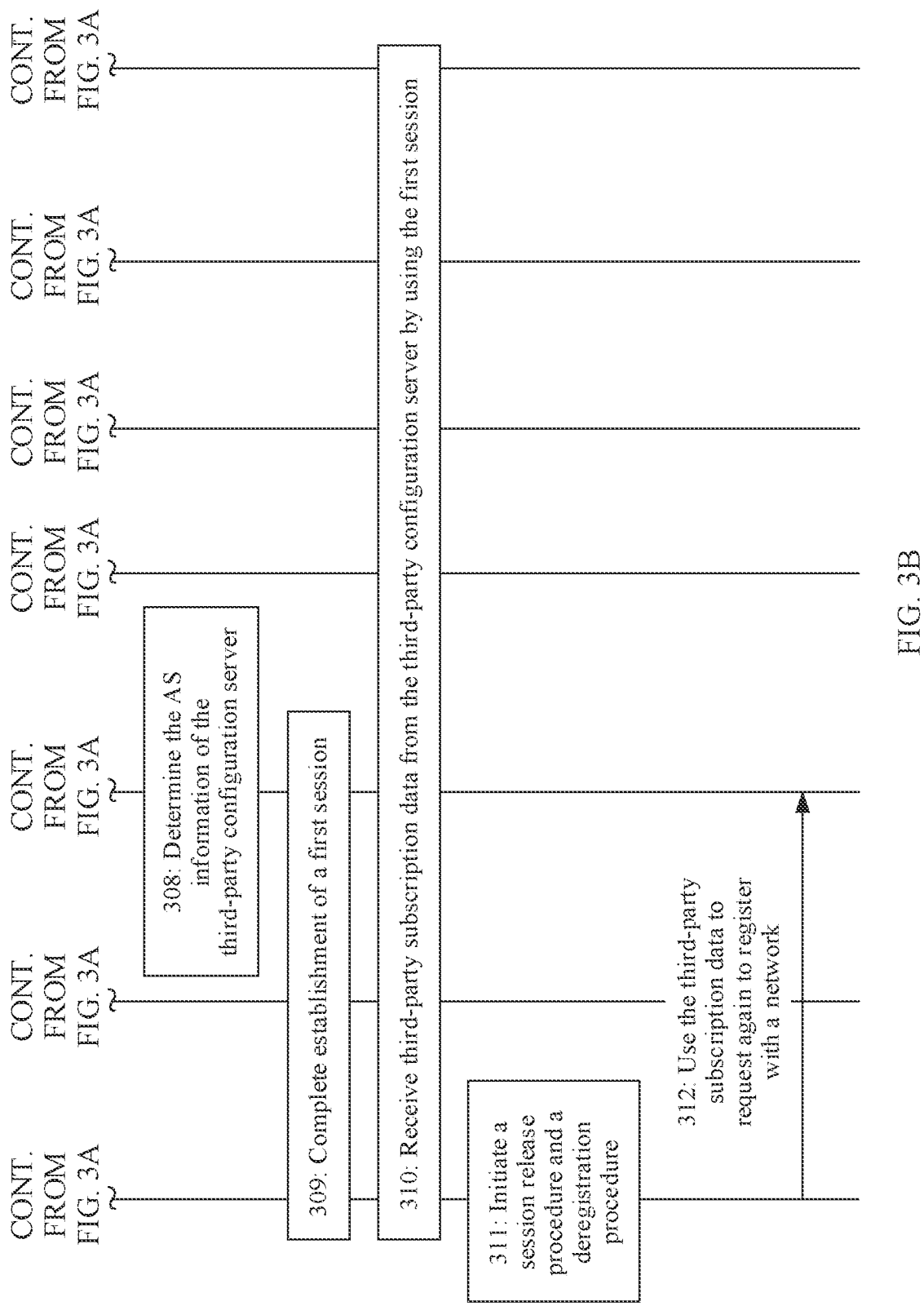

FIG. 3A and FIG. 3B are schematic diagrams of another communication method according to an embodiment of this application. A network side allows a terminal device to establish a restricted second session, and restricts a service of the terminal device (for example, the terminal device can interact only with a third-party configuration server allowed by the network by using a second session). A specific method includes the following steps.

301: The terminal device may perform registration by using existing general registration, or may perform registration shown in steps 201 to 209 in FIG. 2A.

302: The terminal device sends a NAS message to an AMF, where the NAS message includes a session establishment request used to request to establish a second session.

Optionally, the NAS message further includes a restricted DNN.

Optionally, the session establishment request further includes an SP-ID. Optionally, the terminal device may include an identifier SP-ID of a third-party configuration server in the session establishment request, to indicate the third-party configuration server that the network will communicate with. The SP-ID may be used in steps such as 205, 206, 207, and 208.

303: The AMF receives the NAS message. For a specific process, refer to step 211.

304: The AMF sends an N11 message to an SMF, where the N11 message includes the session establishment request.

Optionally, the N11 message further includes the restricted DNN and an SUPI.

Optionally, the session establishment request further includes the SP-ID.

305: Optionally, the SMF obtains AS information of the third-party configuration server from a UDM.

Specifically, the SMF sends an Nudm_SDM_Get request to the UDM, where the Nudm_SDM_Get request includes the SUPI, and the UDM obtains subscription configuration AS information in a shared subscription based on the SUPI.

Optionally, the Nudm_SDM_Get request sent by the SMF to the UDM may further include the SP-ID. In this case, the UDM obtains AS information of a third-party configuration server of a specific SP based on the SUPI and the SP-ID.

Specifically, the UDM feeds back third-party subscription configuration AS information to the SMF, and sends an Nudm_SDM_Get response, where the Nudm_SDM_Get response includes the AS information of the third-party configuration server.

306: Optionally, the SMF obtains the AS information of the third-party configuration server from a DN-AAA.

Specifically, the SMF performs PDU session secondary authentication to obtain the AS information of the third-party configuration server from the DN-AAA.

Optionally, in step 306, the SMF/terminal device sends the SP-ID to the DN-AAA, and obtains the AS information of the third-party configuration server of the specific SP from the DN-AAA.

307: Optionally, the SMF interacts with a PCF, and obtains the AS information of the third-party configuration server from the PCF.

The PCF may dynamically obtain the subscription configuration AS information from an NEF/AF at any moment (for example, before a procedure starts).

Optionally, the SMF may send the SP-ID to the PCF, to obtain the AS information of the third-party configuration server of the specific SP from the PCF.

308: The SMF determines, based on one or more of locally configured AS information of the third-party configuration server, the AS information of the third-party configuration server in the user subscription data in step 305, the AS information of the third-party configuration server in secondary authentication data in step 306, and the AS information of the third-party configuration server in policy data in step 307, AS information of a third-party configuration server of the restricted DNN, such as a port, a destination address, QoS, an IP address, and duration; and sets a session rule, such as a QoS rule and a PDR/FAR, to restrict service information of the second session.

Optionally, the SMF may select a specific UPF based on the restricted DNN.

309: The SMF continues to perform a session establishment procedure to complete establishment of the second session, where the second session is a restricted session.

Specifically, the SMF may further set a PDR/FAR routing rule in a UPF and a QoS rule on the terminal device based on an existing procedure and the session rule that is set in step 308.

310: The terminal device interacts with the third-party configuration server by using the second session, to receive third-party subscription data from the third-party configuration server.

311: After receiving the third-party subscription data, the terminal device initiates a session release procedure and a deregistration procedure. This step is similar to step 214a.

312: The terminal device uses the third-party subscription data to request again to register with the network. For specific descriptions, refer to step 215.

It can be learned from the descriptions of the foregoing embodiment that, the restricted session is established to complete configuration on the third-party subscription data, and the terminal device is prevented from accessing another service. This solution is simple to implement, and easy to deploy and implement.

The foregoing mainly describes, from a perspective of interaction between network elements, solutions provided in this application. It may be understood that, to implement the foregoing functions, each network element includes a corresponding hardware structure and/or software module for implementing each function. Persons skilled in the art may be easily aware that, units and algorithm steps of each example described in combination with the embodiments disclosed in the specification may be implemented by hardware, or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the mobility management network element, the terminal, the data management network element, the authentication service function network element, or the external entity may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that in embodiments of this application, division into the modules is merely example logical function division, and may be other division in an actual implementation.

When an integrated unit is used, FIG. 4 is a schematic diagram of a possible logical structure of the communication apparatus in the foregoing embodiment. The communication apparatus includes a processing module 401 and a communication module 402. The processing module 401 is configured to control and manage actions of the communication apparatus. For example, the processing module 401 is configured to perform a step of information/data processing performed by the communication apparatus. The communication module 402 is configured to support the communication apparatus in performing a step of sending or receiving information/data.

In a possible embodiment, the communication module may be further divided into a sending module and a receiving module.

In a possible embodiment, the communication apparatus may further include a storage module 403, configured to store program code and data of the communication apparatus.

(1) In an example, the communication apparatus is an access management network element, for example, an AMF, or a chip applied to the access management network element. In this case, the communication module 402 is configured to support the communication apparatus in performing the processing steps performed by the access management network element in the embodiments in FIG. 2A, FIG. 2B, FIG. 3A and FIG. 3B. The communication module 402 is configured to support the communication apparatus in performing information/data receiving and sending steps performed by the access management network element in the steps in the embodiments in FIG. 2A, FIG. 2B, FIG. 3A and FIG. 3B. In a possible implementation, details are as follows:

The processing module is configured to: obtain configuration type indication information, determine to perform restricted registration based on the configuration type indication information, and start a restricted registration timer.

After the restricted registration timer expires, the processing module is configured to use the communication module to initiate a deregistration procedure to deregister a terminal device from a network.

Optionally, the processing module is configured to: obtain the configuration type indication information from a registration request, or obtain the configuration type indication information from an N2 message from an access network element, where the N2 message includes the registration request, or use the communication module to request user subscription data of the terminal device from a data management network element, and receive the configuration type indication information returned by the data management network element.

Optionally, the processing module is configured to: obtain a restricted policy, and determine a restricted registration timer based on restricted registration timer information in the restricted policy. The processing module obtains the restricted policy in one or more of the following manners: obtaining the restricted policy from the data management network element by using the communication module, obtaining the restricted policy that is locally configured, or obtaining the restricted policy from a PCF by using the communication module.

Optionally, the processing module is configured to: receive a NAS message from the terminal device by using the communication module, where the NAS message includes a session establishment request and is used to request to establish a first session.

Optionally, the NAS message further includes DNN information that the terminal device requests to access, and the restricted policy includes allowed DNN information. The processing module is configured to: determine whether the DNN information that the terminal device requests to access meets the allowed DNN information, and if yes, perform an establishment procedure of the first session.

Optionally, the restricted policy includes SMF selection information. The processing module is configured to select, based on the SMF selection information, an SMF to provide a service for the first session.

Optionally, the restricted policy includes a roaming policy. The processing module is configured to: determine that a roaming mode supported by the first session is a local breakout mode or a home routed mode according to the roaming policy, and select, based on the supported roaming mode, the SMF to provide the service for the first session.

Optionally, the restricted policy includes a quantity of allowed sessions. The processing module is configured to: determine that a quantity of sessions established by the terminal device is equal to or greater than the allowed quantity of sessions, and reject the NAS message by using the communication module.

(2) In an example, the communication apparatus is a terminal device, for example, UE, or a chip applied to an access management network element. In this case, the communication module 402 is configured to support the communication apparatus in performing the processing steps performed by the terminal device in the embodiments in FIG. 2A, FIG. 2B, FIG. 3A and FIG. 3B. The communication module 402 is configured to support the communication apparatus in performing information/data receiving and sending steps performed by the terminal device in the steps in the embodiments in FIG. 2A, FIG. 2B, FIG. 3A and FIG. 3B. In a possible implementation, details are as follows:

The communication module is configured to: send a registration request to a network to register with the network, send a session establishment request to the network to establish a first session, and receive third-party subscription data from a third-party configuration server by using the first session.

After the communication module receives the third-party subscription data, the processing module initiates a session release procedure and a deregistration procedure by using the communication module, and re-registers with the network using the third-party subscription data by using the communication module.

Optionally, the registration request carries a configuration type indication, and the configuration type indication is used to indicate that the registration is restricted registration.

Optionally, the communication module is configured to send the registration request to the network by using an RRC access message, where the RRC access message carries a configuration type indication, and the configuration type indication is used to indicate that the registration is restricted registration.

Optionally, the communication module is configured to send the session establishment request to the network by using a NAS message, where the NAS message includes a DNN that the terminal device requests to access, and the DNN that the terminal device requests to access is a restricted DNN.

(3) In an example, the communication apparatus is a data management network element, for example, a UDM, or a chip applied to the data management network element. In this case, the communication module 402 is configured to support the communication apparatus in performing the processing steps performed by the data management network element in the embodiments in FIG. 2A, FIG. 2B, FIG. 3A and FIG. 3B. The communication module 402 is configured to support the communication apparatus in performing information/data receiving and sending steps performed by the data management network element in the steps in the embodiments in FIG. 2A, FIG. 2B, FIG. 3A and FIG. 3B. In a possible implementation, details are as follows:

The communication module is configured to receive a request sent by an access management network element for obtaining user subscription data, where the request carries a user identifier.

The processing module is configured to: determine the user subscription data corresponding to the user identifier is configuration subscription data, and send a configuration type indication to access management network element by using the communication module, where the configuration type indication is used to indicate that the registration is restricted registration.

Optionally, the user subscription data corresponding to the user identifier includes indication information, where the indication information indicates that user subscription data is the configuration subscription data.

Optionally, the processing module is configured to: obtain, by the data management network element, a restricted policy, and send restricted policy to the access management network element by using the communication module, where the restricted policy includes restricted registration timer information, and the restricted registration timer information is used to determine a restricted timer.

Optionally, if the user subscription data is shared subscription data, the processing module is further configured to obtain a device identity of a terminal device, and determine, based on the device identity of the terminal device and a usage record in the shared subscription data, whether the terminal device is allowed to use the shared subscription data, where the usage record includes a usage history of a registered terminal device; and if the terminal device is not allowed to use the shared subscription data, use the communication module to notify the access management network element to reject the terminal device.

The processing module 401 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communication module 402 may be a transceiver, a transceiver circuit, a communication interface, or the like. The storage module 403 may be a memory.

Figure 5:
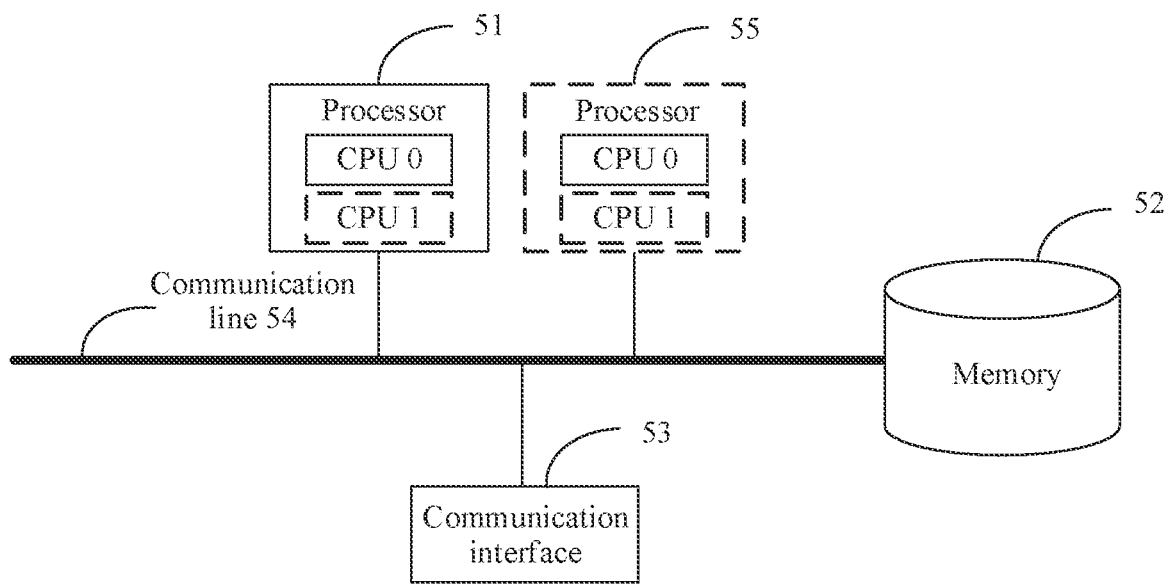
FIG. 5 is a schematic diagram of a communication device according to this application.

When the processing module 401 is a processor 51 or a processor 55, the communication module 402 is a communication interface 53, and the storage module 403 is a memory 52, the communication apparatus in this application may be the communication device shown in FIG. 5.

FIG. 5 is a schematic diagram of a hardware structure of a communication device according to an embodiment of this application. For structures of the access management network element, the data management network element, and the terminal device, refer to the structure shown in FIG. 5. The communication device includes a processor 51, a communication line 54, and at least one communication interface (descriptions are provided merely by using an example in which the communication device includes a communication interface 53 in FIG. 5).

Optionally, the communication device may further include a memory 52.

The processor 51 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication line 54 may include a path for transferring information between the foregoing components.

The communication interface 53 is configured to communicate with another device or a communication network such as the Ethernet, a radio access network (radio access network, RAN), or a wireless local area network (wireless local area network, WLAN) by using any apparatus such as a transceiver.

The memory 52 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (electrically erasable programmable read-only memory, EEPROM), a compact disc read-only memory (compact disc read-only memory, CD-ROM) or other compact disc storage, optical disc storage (which includes a compact disc, a laser disc, an optical disc, a digital versatile disc, a Blu-ray disc, and the like), a magnetic disk storage medium or another magnetic storage device, or any other medium that can be used to carry or store expected program code having an instruction or a data structure form and that can be accessed by a computer. However, this is not limited herein. The memory may exist independently, and is connected to the processor through the communication line 54. Alternatively, the memory may be integrated with the processor.

The memory 52 is configured to store computer-executable instructions for executing the solutions of this application, and the processor 51 controls the execution. The processor 51 is configured to execute the computer-executable instructions stored in the memory 52, to implement a communication method provided in the following embodiments of this application.

Optionally, the computer-executable instructions in this embodiment of this application may also be referred to as application program code. This is not specifically limited in this embodiment of this application.

During specific implementation, in an embodiment, the processor 51 may include one or more CPUs, for example, a CPU 0 and a CPU 1 in FIG. 5.

During specific implementation, in an embodiment, the communication device may include a plurality of processors such as the processor 51 and a processor 55 in FIG. 5. Each of these processors may be a single-core (single-CPU) processor, or may be a multi-core (multi-CPU) processor. The processor herein may be one or more devices or circuits, and/or processing cores configured to process data (for example, computer program instructions).

In embodiments of this application, a specific structure of a body for performing a communication method is not specially limited in embodiments of this application, provided that the body can run a program that records code of the communication method in embodiments of this application, to perform communication according to the communication method in embodiments of this application. This is not limited in this application.

It should be noted that mutual reference may be made between embodiments of this application. For example, for same or similar steps, mutual reference may be made between the method embodiment and the apparatus embodiment. This is not limited.

Figure 6:
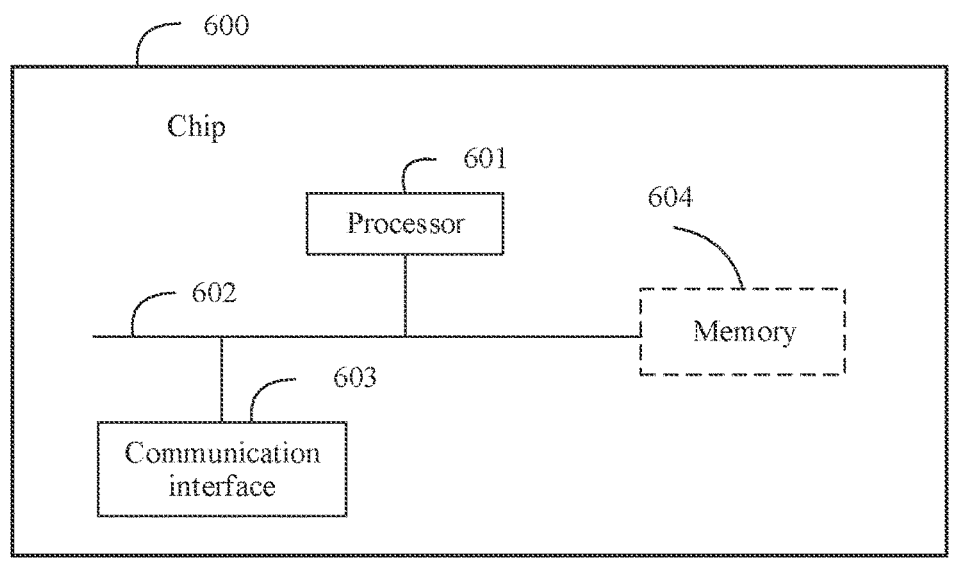
FIG. 6 is a schematic diagram of a chip according to this application.

FIG. 6 is a schematic diagram of a structure of a chip 600 according to an embodiment of this application. The chip 600 includes one or more (including two) processors 601 and a communication interface 603.

Optionally, the chip 600 further includes a memory 604. The memory 604 may include a read-only memory and a random access memory, and provide operation instructions and data for the processor 601. A part of the memory 604 may further include a non-volatile random access memory (non-volatile random access memory, NVRAM).

In some implementations, the memory 604 stores the following elements: an executable module or a data structure, a subset thereof, or an extended set thereof.

In this embodiment of this application, a corresponding operation is performed by invoking the operation instructions (where the operation instructions may be stored in an operating system) stored in the memory 604.

In a possible implementation, structures of chips used by an access management network element, a data management network element, and a terminal device are similar, and different apparatuses may use different chips to implement respective functions.

The processor 601 controls a processing operation of any one of the access management network element, the data management network element, and the terminal device. The processor 601 may also be referred to as a central processing unit (central processing unit, CPU).

The memory 604 may include a read-only memory and a random access memory, and provide instructions and data for the processor 601. A part of the memory 604 may further include an NVRAM. For example, in an application, the memory 604, the communication interface 603, and the memory 604 are coupled together through a bus system 602. The bus system 602 may further include a power bus, a control bus, a status signal bus, and the like in addition to a data bus. However, for clear description, various buses in FIG. 6 are all marked as the bus system 602.

The foregoing methods disclosed in embodiments of this application may be applied to the processor 601, or may be implemented by the processor 601. The processor 601 may be an integrated circuit chip and has a signal processing capability. In an implementation process, the steps in the foregoing method may be completed by using an integrated logic circuit of hardware in the processor 601 or instructions in a form of software. The processor 601 may be a general-purpose processor, a digital signal processor (digital signal processing, DSP), an ASIC, a field-programmable gate array (field-programmable gate array, FPGA) or another programmable logic device, a discrete gate or a transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 604. The processor 601 reads information from the memory 604, and completes the steps of the foregoing method in combination with the hardware in the processor 601.

In a possible implementation, the communication interface 603 is configured to perform receiving and sending steps of corresponding network elements in the embodiments shown in FIG. 2A, FIG. 2B, FIG. 3A and FIG. 3B. The processor 601 is configured to perform processing steps of corresponding network elements in the embodiments shown in FIG. 2A, FIG. 2B, FIG. 3A and FIG. 3B.

The communication unit may be a communication interface of the apparatus, and is configured to receive a signal from another apparatus. For example, when the apparatus is implemented as a chip, the communication unit is a communication interface used by the chip to receive a signal from another chip or apparatus or send a signal to another chip or apparatus, for example, a pin of the chip.

Figure 7:
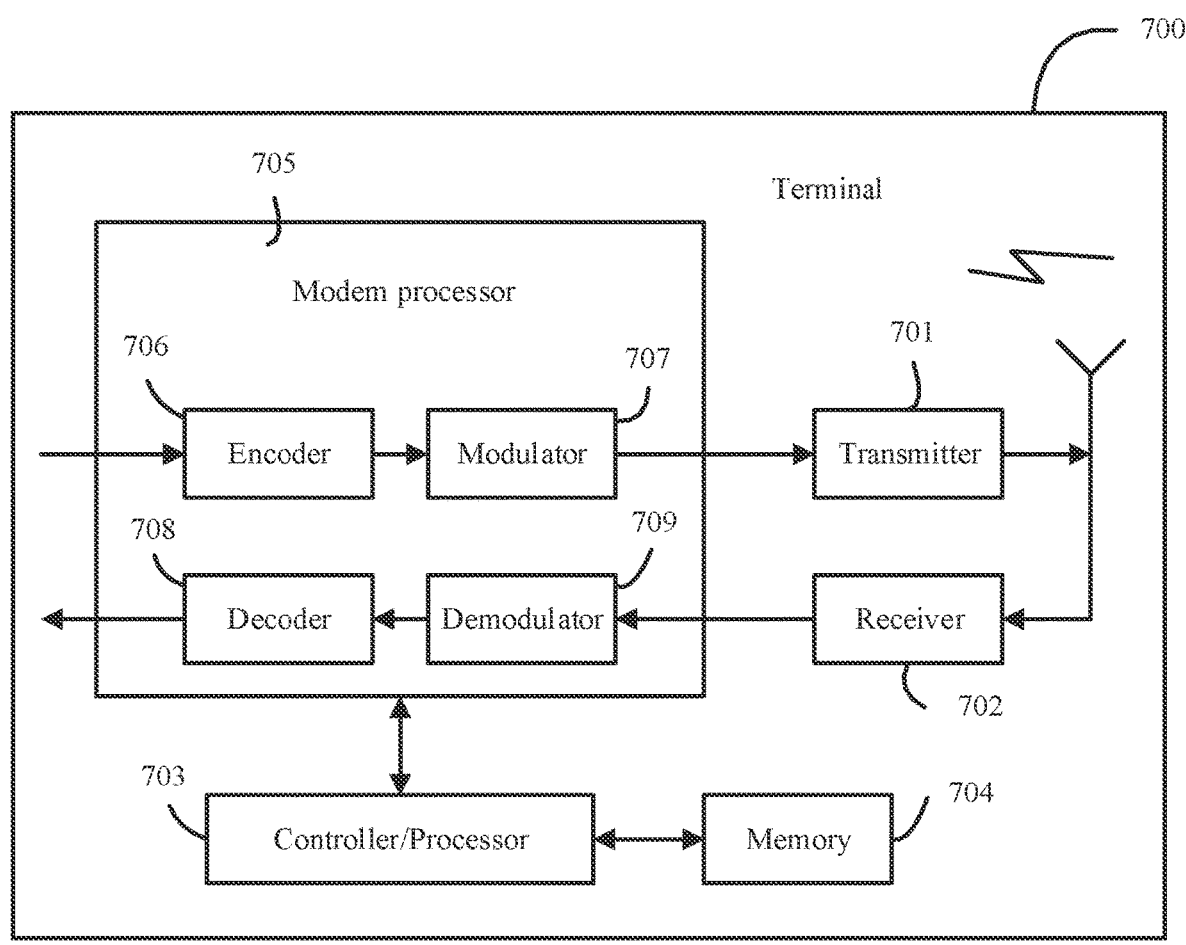
FIG. 7 is a schematic diagram of a terminal device according to this application.

FIG. 7 is a simplified schematic diagram of a possible design structure of a terminal device according to an embodiment of this application. The terminal 700 includes a transmitter 701, a receiver 702, and a processor 703. The processor 703 may be a controller, and is represented as "controller/processor 703" in FIG. 7. Optionally, the terminal 700 may further include a modem processor 705. The modem processor 705 may include an encoder 706, a modulator 707, a decoder 708, and a demodulator 709.

In an example, the transmitter 701 adjusts (for example, through analog conversion, filtering, amplification, and up-conversion) output sampling and generates an uplink signal, and the uplink signal is transmitted to the DNS and the P-CSCF in the foregoing embodiment by using an antenna. In a downlink, a downlink signal is received by using the antenna. The receiver 702 adjusts (for example, performs filtering, amplification, down conversion, and digitalization on) a signal received from the antenna and provides an input sample. In the modem processor 705, the encoder 706 receives service data and a signaling message that are to be sent on an uplink, and processes (for example, formats, encodes, and interleaves) the service data and the signaling message. The modulator 707 further processes (for example, performs symbol mapping and modulation on) encoded service data and an encoded signaling message and provides an output sample. The demodulator 709 processes (for example, demodulates) the input sample and provides symbol estimation. The decoder 708 processes (for example, de-interleaves and decodes) the symbol estimation and provides decoded data and a decoded signaling message that are to be sent to the terminal 700. The encoder 706, the modulator 707, the demodulator 709, and the decoder 708 may be implemented by the combined modem processor 705. These units perform processing based on a radio access technology (for example, an access technology in LTE and another evolved system) used in a radio access network. It should be noted that, when the terminal 700 does not include the modem processor 705, the foregoing functions of the modem processor 705 may alternatively be implemented by using the processor 703.

The processor 703 controls and manages an action of the terminal device 700, to perform a processing process implemented by the terminal device 700 in the foregoing embodiment of this application. For example, the processor 703 is further configured to perform a processing process of the terminal device in the methods shown in FIG. 3A, FIG. 3B, and FIG. 4 and/or another process of the technical solutions described in this application.

Further, the terminal device 700 may further include a memory 704, where the memory 704 is configured to store program code and data of the terminal device 700.

An embodiment of this application provides a computer-readable storage medium. The computer-readable storage medium stores instructions. When the instructions are run, a function of the access management network element in FIG. 2A, FIG. 2B, FIG. 3A and FIG. 3B is implemented.

An embodiment of this application provides a computer-readable storage medium. The computer-readable storage medium stores instructions. When the instructions are run, a function of the terminal device in FIG. 2A, FIG. 2B, FIG. 3A and FIG. 3B is implemented.

An embodiment of this application provides a computer-readable storage medium. The computer-readable storage medium stores instructions. When the instructions are run, a function of the data management network element in FIG. 2A, FIG. 2B, FIG. 3A and FIG. 3B is implemented.

An embodiment of this application provides a computer program product including instructions. The computer program product includes the instructions. When the instructions are run, a function of the access management network element in FIG. 2A, FIG. 2B, FIG. 3A and FIG. 3B is implemented.

An embodiment of this application provides a computer program product including instructions. The computer program product includes the instructions. When the instructions are run, a function of the terminal device in FIG. 2A, FIG. 2B, FIG. 3A and FIG. 3B is implemented.

An embodiment of this application provides a computer program product including instructions. The computer program product includes the instructions. When the instructions are run, a function of the data management network element in FIG. 2A, FIG. 2B, FIG. 3A and FIG. 3B is implemented.

An embodiment of this application provides a chip. The chip is applied to a network management network element. The chip includes at least one processor and a communication interface, the communication interface is coupled to the at least one processor, and the processor is configured to run instructions, to implement a function of the access management network element in FIG. 2A, FIG. 2B, FIG. 3A and FIG. 3B.

An embodiment of this application provides a chip. The chip is applied to a donor node. The chip includes at least one processor and a communication interface, the communication interface is coupled to the at least one processor, and the processor is configured to run instructions, to implement a function of the terminal device in FIG. 2A, FIG. 2B, FIG. 3A and FIG. 3B.

An embodiment of this application provides a chip. The chip is applied to an IAB node. The chip includes at least one processor and a communication interface, the communication interface is coupled to the at least one processor, and the processor is configured to run instructions, to implement a function of the data management network element in FIG. 2A, FIG. 2B, FIG. 3A and FIG. 3B.

An embodiment of this application provides a communication system, where the communication system includes an access management network element and a data management network element. The access management network element is configured to perform any step performed by the access management network element in FIG. 2A, FIG. 2B, FIG. 3A and FIG. 3B, and the data management network element is configured to perform any step performed by the data management network element in FIG. 2A, FIG. 2B, FIG. 3A and FIG. 3B.

An embodiment of this application further provides a computer-readable storage medium. The method described in the foregoing method embodiments may be all or partially implemented by using software, hardware, firmware, or any combination thereof. If the methods are implemented in software, functions may be stored as one or more instructions or code on the computer-readable medium or transmitted on a computer-readable medium. The computer-readable medium may include a computer storage medium and a communication medium, and may further include any medium capable of transferring a computer program from one place to another. The storage medium may be any available medium accessible to a computer.

In an optional design, the computer-readable medium may include a RAM, a ROM, an EEPROM, a CD-ROM or another optical disc memory, a magnetic disk memory or another magnetic storage device, or any other medium that can be configured to carry or store required program code in a form of instructions or a data structure and that may be accessed by the computer. In addition, any connection may be appropriately referred to as a computer-readable medium.

For example, if software is transmitted from a website, a server, or another remote source by using a coaxial cable, a fiber optical cable, a twisted pair, a digital subscriber line (DSL), or wireless technologies (for example, infrared ray, radio, and microwave), the coaxial cable, the fiber optical cable, the twisted pair, the DSL, or the wireless technologies such as infrared ray, radio and microwave are included in the definition of a medium. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. The combination described above should also be included in the scope of the computer-readable medium.

An embodiment of this application further provides a computer program product. The method described in the foregoing method embodiments may be all or partially implemented by using software, hardware, firmware, or any combination thereof. If the method is implemented in software, all or some of the methods may be implemented in a form of the computer program product. The computer program product includes one or more computer instructions. When the computer program instructions are loaded and executed on a computer, all or some of the procedures or functions described according to the foregoing method embodiments are generated. The computer may be a general-purpose computer, a special-purpose computer, a computer network, a network device, user equipment, or another programmable apparatus.

All or some of the foregoing embodiments may be implemented by software, hardware, firmware, or any combination thereof. When software is used to implement the embodiments, all or some of the embodiments may be implemented in a form of the computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (Solid State Disk, SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and the microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk drive, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be disposed in an ASIC, and the ASIC may be disposed in a terminal device. Optionally, the processor and the storage medium may alternatively be disposed in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
receiving, by an access management network element, a registration request from a terminal device;
obtaining, by the access management network element, configuration type indication information;
determining, based on the configuration type indication information, to perform restricted registration;
starting, by the access management network element, a restricted registration timer, wherein the restricted registration timer indicates a time duration in which the terminal device is allowed to establish a session to obtain subscription data; and
after the restricted registration timer expires, initiating, by the access management network element, a deregistration procedure to deregister the terminal device from a network.

2. The method according to claim 1, wherein the obtaining comprises:
obtaining, by the access management network element, the configuration type indication information from the registration request; or
obtaining, by the access management network element, the configuration type indication information from an N2 message from an access network element, wherein the N2 message comprises the registration request; or
requesting, by the access management network element, UE subscription data of the terminal device from a data management network element, and receiving the configuration type indication information returned by the data management network element.

3. The method according to claim 1, wherein before the starting, by the access management network element, a restricted registration timer, the method comprises:
obtaining, by the access management network element, a restricted policy; and
determining the restricted registration timer based on restricted registration timer information in the restricted policy, wherein obtaining the restricted policy comprises at least one of:
obtaining the restricted policy from a data management network element;
obtaining the restricted policy that is locally configured; or
obtaining the restricted policy from a policy control function (PCF).

4. The method according to claim 1, wherein the method further comprises:
receiving, by the access management network element, a non-access stratum (NAS) message from the terminal device, wherein the NAS message comprises a session establishment request used to request to establish a first session.

5. The method according to claim 4, wherein the NAS message further comprises data network name (DNN) that the terminal device requests to access, and the method further comprises:
obtaining, by the access management network element, a restricted policy comprising allowed DNN information;
determining, by the access management network element, whether the DNN that the terminal device requests to access meets the allowed DNN information; and
in response to determining that the DNN that the terminal device requests to access meets the allowed DNN information, performing an establishment procedure of the first session.

6. The method according to claim 1, further comprising:
determining a duration of the restricted registration timer based on a duration of the periodic registration timer or a mobile reachable timer, where the duration of the periodic registration timer or the mobile reachable timer is less than or equal to the duration of the restricted registration timer.

7. The method according to claim 1, further comprising:
determining a duration of the periodic registration timer or a mobile reachable timer based on a duration of the restricted registration timer, where the duration of the periodic registration timer or the mobile reachable timer is less than or equal to the duration of the restricted registration timer.

8. An access management network element, comprising:
a transceiver;
at least one processor; and
one or more memories coupled to the at least one processor and storing programming instructions for execution by the at least one processor to:
obtain configuration type indication information;
determine to perform restricted registration based on the configuration type indication information;
start a restricted registration timer, wherein the restricted registration timer indicates a time duration in which a terminal device is allowed to establish a session to obtain subscription data; and
after the restricted registration timer expires, initiate, by the transceiver, a deregistration procedure to deregister a terminal device from a network.

9. The access management network element according to claim 8, wherein the programming instructions are for execution by the at least one processor to:
obtain the configuration type indication information from a registration request; or
obtain the configuration type indication information from an N2 message from an access network element, wherein the N2 message comprises the registration request; or
request, by the transceiver, user subscription data of the terminal device from a data management network element, and receive the configuration type indication information returned by the data management network element.

10. The access management network element according to claim 8, wherein the programming instructions are for execution by the at least one processor to:
obtain a restricted policy; and
determine the restricted registration timer based on restricted registration timer information in the restricted policy, wherein obtaining the restricted policy comprises at least one of:
obtaining the restricted policy from a data management network element;
obtaining the restricted policy that is locally configured; or
obtaining, by the transceiver, the restricted policy from a policy control function (PCF).

11. The access management network element according to claim 8, wherein the programming instructions are for execution by the at least one processor to:
receive, by the transceiver, a non-access stratum (NAS) message from the terminal device, wherein the NAS message comprises a session establishment request and is used to request to establish a first session.

12. The access management network element according to claim 11, wherein the NAS message further comprises data network name (DNN) that the terminal device requests to access, and the programming instructions are for execution by the at least one processor to:
obtain a restricted policy comprising allowed DNN information;
determine whether the DNN that the terminal device requests to access meets the allowed DNN information; and
in response to determining that the DNN that the terminal device requests to access meets the allowed DNN information, perform an establishment procedure of the first session.

* * * * *